US012767229B2

(12) United States Patent
Tanner et al.

(10) Patent No.: US 12,767,229 B2
(45) Date of Patent: Oct. 20, 2026

(54) VEHICLE WITH UNDERRIDE LOAD TRANSFER MEMBER

(71) Applicant: GM GLOBAL TECHNOLOGY OPERATIONS LLC, Detroit, MI (US)

(72) Inventors: Robert W. Tanner, Shelby Township, MI (US); Robert N. Saje, Shelby Township, MI (US); Robert Ristoski, Shelby Township, MI (US); Andrew Kacherski, Royal Oak, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 294 days.

(21) Appl. No.: 18/741,511

(22) Filed: Jun. 12, 2024

(65) Prior Publication Data

US 2025/0382011 A1 Dec. 18, 2025

(51) Int. Cl.
*B62D 21/15* (2006.01)
*B62D 25/08* (2006.01)
*B60R 21/00* (2006.01)

(52) U.S. Cl.
CPC ........... *B62D 21/155* (2013.01); *B62D 25/08* (2013.01); *B62D 25/088* (2013.01); *B60R 2021/002* (2013.01)

(58) Field of Classification Search
CPC .... B62D 21/15; B62D 21/152; B62D 21/155; B62D 21/11; B62D 25/08; B62D 25/082; B62D 25/087; B62D 25/088; B60R 2021/0004; B60R 2021/002; B60R 2021/0023; B60R 2021/0011
USPC ........................... 296/187.03, 187.09, 187.11
See application file for complete search history.

(56) References Cited

U.S. PATENT DOCUMENTS 3,765,715 A * 10/1973 Franchini ............. B62D 25/145 296/187.05
4,887,862 A * 12/1989 Bassi .................. B62D 27/065 52/783.17
5,071,188 A * 12/1991 Thum .................. B62D 21/155 296/205
5,102,164 A * 4/1992 Fujinaka ............. B62D 25/088 296/1.03
(Continued)

FOREIGN PATENT DOCUMENTS

DE 4030921 A1 4/1991
DE 29800768 U1 5/1999
(Continued)

*Primary Examiner* — Gregory A Blankenship
(74) *Attorney, Agent, or Firm* — Ingrassia Fisher & Lorenz, LLP | IFL

(57) ABSTRACT

In accordance with example implementations, a vehicle includes a front, a back, and a chassis extending longitudinally between the front and the back. At least one vertical suspension assembly has an upper end coupled to the chassis and a lower end coupled to a wheel. A load transfer member is disposed between the at least one vertical suspension assembly and the front or back, wherein the load transfer member comprises a distal end, a raised end higher than the distal end, and a ramp portion with an outer ramp surface extending between the distal end and the raised end, wherein the distal end is closer to the front or back than the raised end so that the ramp surface faces outward on the vehicle, and wherein the raised end extends upward toward the upper end of the vertical suspension assembly.

20 Claims, 6 Drawing Sheets

(56) References Cited

U.S. PATENT DOCUMENTS

| | | | | |
|---|---|---|---|---|
| 5,244,248 | A * | 9/1993 | Bovellan | B62D 21/152 296/203.02 |
| 5,346,276 | A * | 9/1994 | Enning | B62D 25/088 296/203.02 |
| 5,882,064 | A * | 3/1999 | Emmons | B62D 23/00 296/193.04 |
| 6,193,273 | B1 * | 2/2001 | Novak | B62D 21/00 280/781 |
| 6,736,448 | B2 * | 5/2004 | Hanakawa | B62D 21/155 296/203.02 |
| 11,034,385 | B2 * | 6/2021 | Moss | B62D 21/152 |
| 2006/0214414 | A1 * | 9/2006 | Wehner | B62D 21/152 296/187.11 |
| 2007/0215402 | A1 * | 9/2007 | Sasaki | B62D 29/008 180/232 |
| 2013/0161978 | A1 * | 6/2013 | Herntier | B62D 25/082 296/193.09 |
| 2015/0021935 | A1 * | 1/2015 | Baccouche | B60R 19/14 293/114 |
| 2015/0102635 | A1 * | 4/2015 | Barbat | B60R 19/04 296/187.1 |
| 2015/0166108 | A1 * | 6/2015 | Persson | B62D 25/088 296/187.09 |
| 2015/0360632 | A1 * | 12/2015 | Nishida | B60R 19/34 293/133 |
| 2017/0174264 | A1 * | 6/2017 | Maruyama | B62D 21/11 |
| 2018/0154943 | A1 * | 6/2018 | Huang | B62D 21/02 |
| 2020/0114849 | A1 * | 4/2020 | Barman | B60R 19/16 |
| 2020/0114976 | A1 * | 4/2020 | Matsuoka | B62D 25/14 |
| 2021/0139077 | A1 * | 5/2021 | Jeong | B62D 25/08 |
| 2023/0234643 | A1 * | 7/2023 | Einwang | B62D 27/023 |
| 2024/0278838 | A1 * | 8/2024 | Nagasawa | B62D 25/082 |
| 2024/0278847 | A1 * | 8/2024 | Nagasawa | B62D 25/082 |
| 2024/0278850 | A1 * | 8/2024 | Nagasawa | B62D 25/085 |
| 2025/0326439 | A1 * | 10/2025 | Tachikawa | B62D 25/082 |
| 2025/0382011 | A1 * | 12/2025 | Tanner | B62D 21/155 |

FOREIGN PATENT DOCUMENTS

| | | | |
|---|---|---|---|
| DE | 19860562 | A1 | 6/2000 |
| DE | 10157837 | A1 | 5/2003 |
| DE | 69719744 | T2 | 12/2003 |
| DE | 102017003392 | A1 | 10/2018 |
| DE | 102019201881 | A1 | 8/2019 |
| DE | 102020209517 | A1 | 6/2021 |
| DE | 102020129585 | A1 | 12/2021 |

* cited by examiner

VEHICLE WITH UNDERRIDE LOAD TRANSFER MEMBER

INTRODUCTION

The technical field generally relates to vehicles and, more specifically, to vehicles with load transfer structure to handle impact loads experienced by the vehicle.

Many vehicles have structures to absorb or guide impact forces or loads from an external object contacting the vehicle. Managing loads such as to control longitudinal compression of components at the engine compartment may be desirable.

Accordingly, it is desirable to provide structures that manage longitudinal forces. Furthermore, other desirable features and characteristics of the present disclosure will become apparent from the subsequent detailed description and the appended claims, taken in conjunction with the accompanying drawings and the foregoing introduction.

SUMMARY

In an example implementation, a vehicle includes a front, a back, and a chassis extending longitudinally between the front and the back. At least one vertical suspension assembly has an upper end coupled to the chassis and a lower end coupled to a wheel. A load transfer member is disposed between the at least one vertical suspension assembly and the front or back. The load transfer member includes a distal end, a raised end higher than the distal end, and a ramp portion with an outer ramp surface extending between the distal end and the raised end. The distal end is closer to the front or back than the raised end so that the ramp surface faces outward on the vehicle. The raised end extends upward toward the upper end of the vertical suspension assembly.

Also in an example implementation, the chassis includes a longitudinal rail. At least part of the load transfer member is disposed directly over the longitudinal rail and is coupled to the longitudinal rail to transfer loads from the load transfer member to the longitudinal rail.

Also in an example implementation, the vertical suspension assembly includes a sidewall extending downwardly from the upper end and at least partly around the vertical suspension assembly.

Also in an example implementation, the vehicle includes a vertical brace extending upward from the longitudinal rail and being proximal to the sidewall. The raised end faces the vertical brace.

Also in an example implementation, the raised end is coupled to the vertical brace.

Also in an example implementation, the load transfer member is arranged so that a horizontal force impacted at the ramped portion causes the raised end to move downward against the vertical brace or sidewall to cause a downwardly directed load on the vertical suspension assembly.

Also in an example implementation, the load transfer member is wedge-shaped. The raised end forms a top of the wedge shape, and a vertical side of the load transfer member faces or is coupled to the vertical brace or sidewall.

Also in an example implementation, the load transfer member is triangular and has a solid web.

Also in an example implementation, the load transfer member is triangular and has a bottom side, a vertical side extending between the bottom side and the raised end, and at least one rib extending from the diagonal portion to either the bottom side or the vertical side.

Also in an example implementation, the ramp surface is at least one of: planar, curved, concave, convex, wave-form, sinusoidal, uniformly stepped, and non-uniformly stepped.

In an example implementation, a load transfer member of a vehicle includes a web having a triangular shape with an outer bottom surface with a distal end, an outer vertical surface with a raised upper end, and a ramp surface between the raised upper end and the distal end. Also, the web includes a bottom beam having the bottom surface and being coupled to a longitudinal rail of a chassis of the vehicle, and a vertical beam having the vertical surface and being coupled to a vertical shock tower brace extending upward from the longitudinal rail. The vertical shock tower brace is coupled to a sidewall covering a vertical suspension assembly, and the web is disposed between the vertical suspension assembly and a front of the vehicle. The distal end is more exterior on the vehicle than the raised end so that the ramp surface faces outward on the vehicle, and the raised end extends upward toward an upper end of the vertical suspension assembly.

Also in an example implementation, the web includes at least one rib positioned to direct external load impacted at the ramp surface at least partially vertically downward through the web.

Also in an example implementation, the member includes a ramp beam having the ramp surface. The at least one rib extends from the ramp beam and toward the vertical surface, the bottom surface, or both.

Also in an example implementation, the web includes a thin plate portion between multiple ribs or an opening between multiple ribs or both.

Also in an example implementation, the web is formed of multiple diagonal parallel ribs extending downward and rearward from the ramp beam.

Also in an example implementation, the web is formed of multiple ribs forming a triangular truss pattern or a non-parallel rib pattern.

In an example implementation, an impact load transfer system includes a vehicle that includes: a front, a back, and a chassis extending longitudinally between the front and the back, and at least one vertical suspension assembly having an upper end coupled to the chassis and a lower end coupled to a wheel. A load transfer member is disposed between the at least one vertical suspension assembly and the front or back. The load transfer member includes a distal end, a raised end higher than the distal end, and a ramp portion with an outer ramp surface extending between the distal end and the raised end. The distal end is closer to the front or back than the raised end so that the ramp surface faces outward on the vehicle, and the raised end is proximal to the vertical suspension assembly.

Also in an example implementation, the load transfer member is formed of a crackable material and structure while impacting expected load amounts.

Also in an example implementation, the load transfer member is arranged on the vehicle so that the ramp surface causes an external barrier to cause an impact to the vertical suspension assembly closer to a top of the vertical suspension assembly than would occur without the load transfer member.

Also in an example implementation, the load transfer member includes two portions each with a different material than the other portion to provide different load absorption and load transfer properties at the two portions.

DESCRIPTION OF THE DRAWINGS

The present disclosure will hereinafter be described in conjunction with the following drawing figures, wherein like numerals denote like elements and the drawings are not to scale, and wherein.

DETAILED DESCRIPTION

The following detailed description merely describes example implementations and are not intended to limit the disclosure or the application and uses thereof. Furthermore, no intention exists to be bound by any theory presented in the preceding background or the following detailed description.

Herein, the terms 'coupled' and 'connected' are used interchangeably to refer to the relationship between objects and include direct contact between objects as well as connection through intervening objects.

Also herein, the terms 'vertical', 'horizontal', 'up', 'down', 'higher', and 'lower' are relative to each other on the vehicle and not necessarily relative to the ground unless context clearly indicates otherwise. Also, the term 'substantially' refers to within 5% of a specified amount.

Underride contact loads are experienced by some vehicles when a vehicle contacts another object (referred to as a barrier herein) in front of the vehicle, such as a back of a truck, a guard rail, and so forth. In these cases, the forward momentum of the vehicle can move the front of the vehicle under the barrier. In these cases, the impact loads often are managed solely by body structure of the vehicle, and particularly by transmitting longitudinal loads from the front of the vehicle and onto the engine compartment components. This often causes longitudinal compression at the engine compartment.

To resolve this issue, the presently disclosed vehicle has a load transfer member to manage horizontal underride contact loads more efficiently by converting or transferring horizontal axial loads into vertical loads. The load transfer member redirects the horizontal loads into vertical loads on the suspension and other systems as well as the tires to absorb load energy. The load transfer member may be wedge-shaped and has properties set to establish a predetermined balance between transferring and absorbing loads. As a result, the load transfer member allows for multiple subsystems to contribute to load dispersion and creates an integrated, more efficient external object contact strategy that manages the amount of longitudinal compression and distance of infiltration of damage at the engine compartment at least with underride contact situations.

Figure 1:
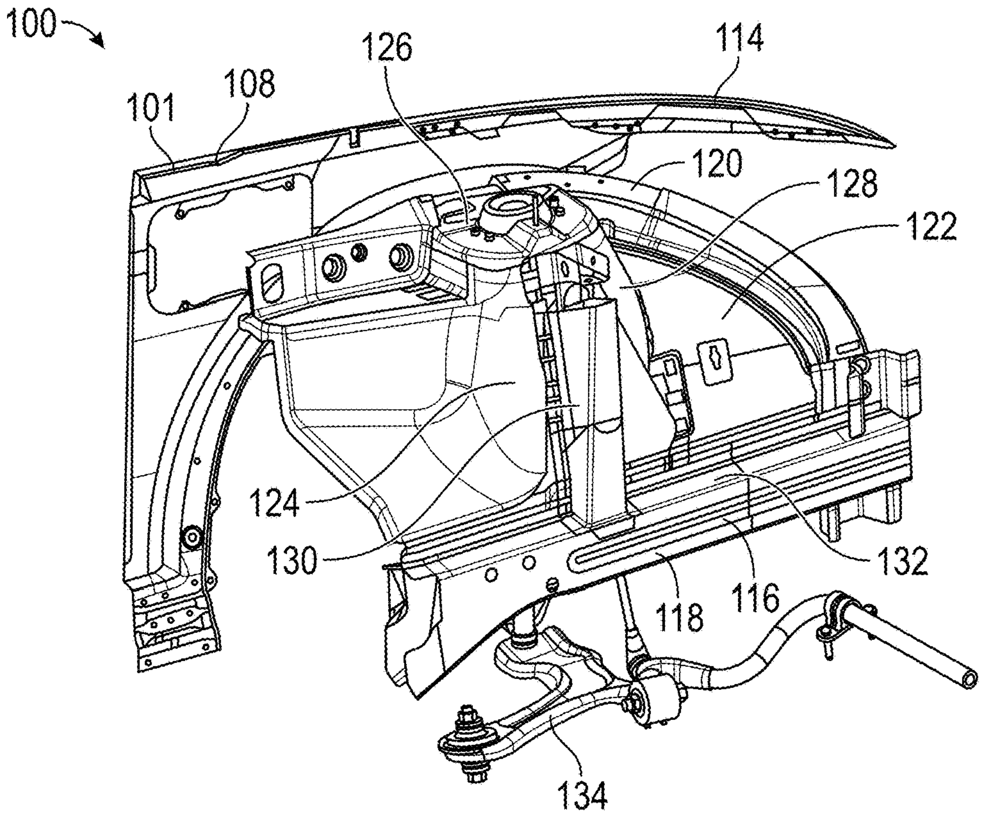
FIG. 1 is a schematic diagram of a cross-sectional, perspective, exterior-facing side and upper view of a front left side of a vehicle for application of a load transfer member according to at least one of the implementations herein.
Figure 1A:
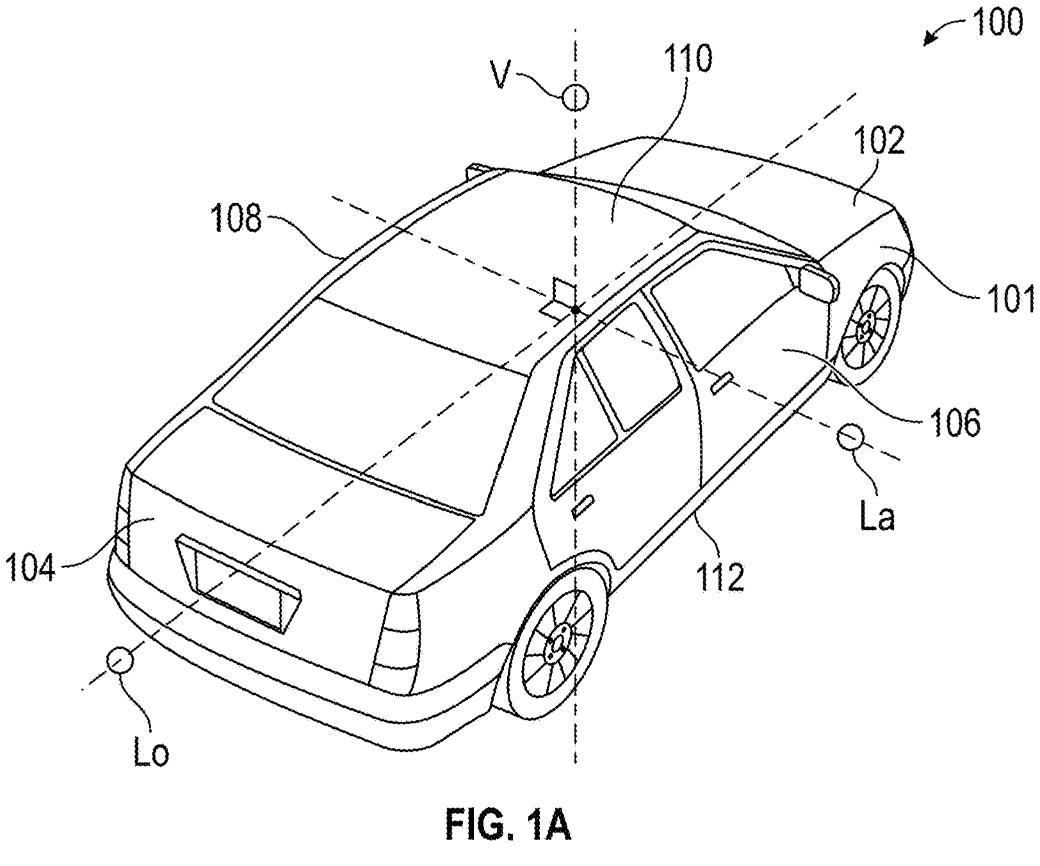
FIG. 1A is a perspective view of a vehicle with an axes system used to refer to components of FIG. 1.
Figure 2:
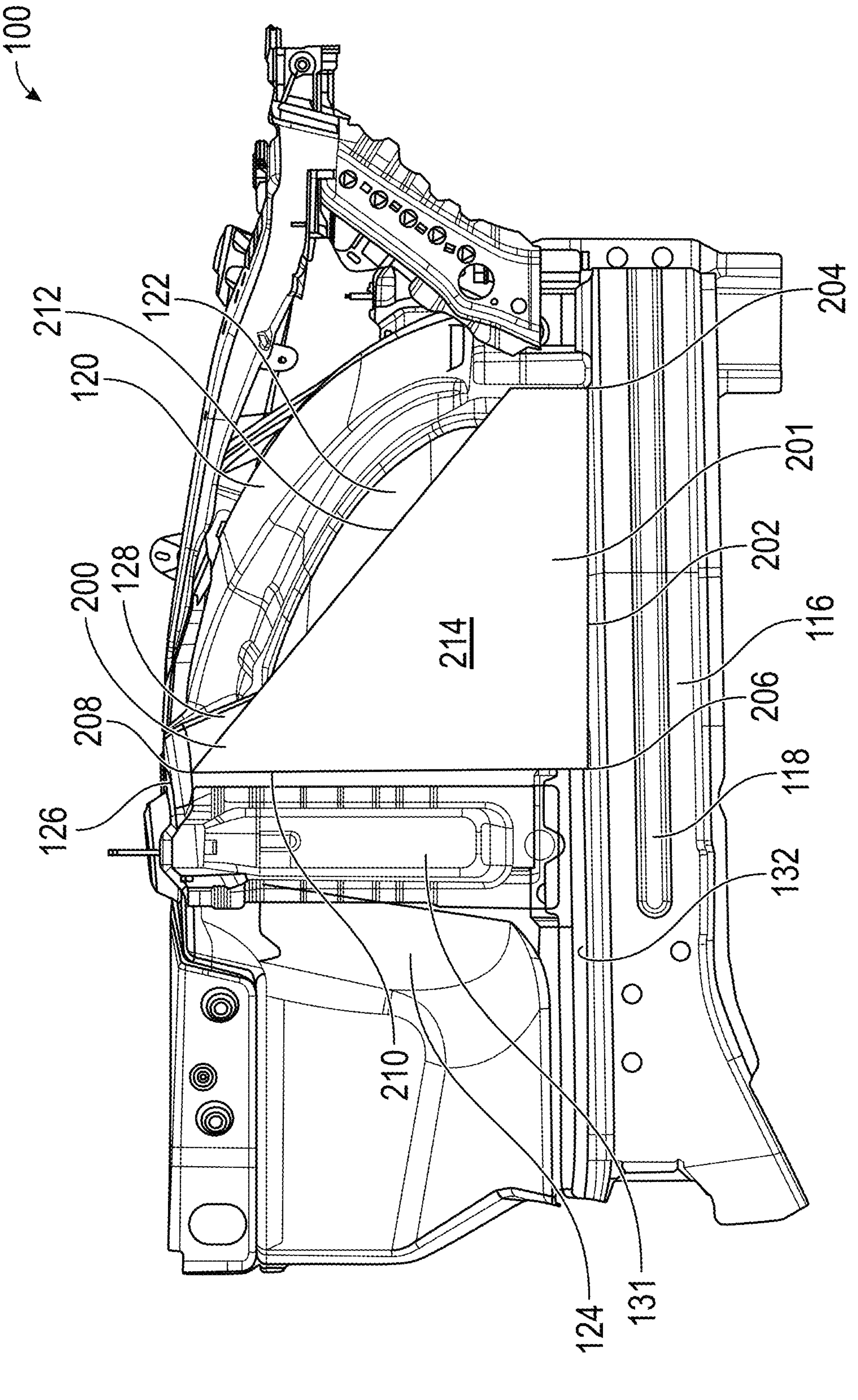
FIG. 2 is a schematic diagram of a cross-sectional exterior-facing side view of a front left side of a vehicle with an example load transfer member according to at least one of the implementations herein.

Referring to FIGS. 1A, 1, and 2 for more detail, an example vehicle 100 is a vehicle with a suspension that transmits vertical loads such as automobiles including, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles. Otherwise, the vehicle also may comprise a motorcycle or other vehicle, such as aircraft, spacecraft, watercraft, ski-craft, and so on, and/or one or more other types of mobile platforms (e.g., a robot and/or other mobile platform).

Referring first to FIG. 1A, the vehicle 100 and any vehicle mentioned herein is referred to with an axes system where the vehicle 100 has a body 101, and the vehicle 100 (and the body 101) has a front 102, a back 104, a right side 106, and a left side 108 relative to a driver facing forward. The body 101 also has a top 110 and a bottom 112. The vehicle 100 also has a longitudinal axis or direction Lo extending between the back 104 and front 102, while a lateral axis or direction La extends between the left and right sides 106 and 108 of the vehicle and perpendicular to the longitudinal axis Lo. The lateral and longitudinal axes Lo and La define a horizonal direction on the vehicle, while a vertical axis V perpendicular to axes Lo and La extends between the top and bottom 110, 112 of the vehicle 100 and defines a vertical direction on the vehicle 100. It will be understood that terms horizonal and vertical (or horizontal and vertical directions) herein are not necessarily precisely perpendicular to each other and may refer to general directions relative to each other unless the context indicates otherwise.

Referring to FIGS. 1-2, an exterior-facing view of vehicle 100 is looking outward from an inside of the vehicle 100 and at a left front fender (or left front panel or corner) 114 of the body 101 at the left side 108 of the vehicle 100. The vehicle 100 has a chassis 116 with at least one longitudinal rail 118 that supports the body 101 (at locations not shown) as well as an elephant trunk 120. The longitudinal rail 118 and the elephant trunk 120 cooperatively support a wheel house 122 and a shock (or strut) tower 124. The shock tower 124 has a cap (or upper end) 126 and an outer wall 128 extending downward from the cap 126 and that extends around a suspension assembly (shown in FIG. 4) within the shock tower 124 and that is coupled to a lower suspension system 134 to absorb or reduce vertical forces. A vertical shock tower brace or beam (or column or member) 130 sits on a top surface 132 of the longitudinal rail 118 and is coupled to the shock tower 124 to provide further support for the shock tower 124. The vertical shock tower brace 130 directs vertical forces between the suspension system 134 (and vertical suspension assembly (FIG. 4)) and the longitudinal rail 118.

Referring to FIG. 2, the vehicle 100 has a load transfer member 200, in this example, shaped as a wedge 201. The load transfer member 200 has a bottom side 202 extending from a distal end 204 and to an interior corner 206, and a raised end 208 that is on a top or upper portion of a vertical side 210 of the load transfer member 200. By one example, a ramp (or diagonal or slanted) side or surface 212 extends between the distal end 204 and the raised end 208 to form a generally triangular shape or triangle in a side view as shown. The vertical brace 130 has been removed to show a vertical brace coupling area or portion 131 of the shock tower sidewall or outer wall 128 where the vertical brace 130 attaches to the wall 128.

The load transfer member 200 has a web or wall 214 that can be arranged in many different ways as desired in order to control the direction and amounts of impact loads being transferred and/or absorbed. Thus, the web 214 may be a single flat, continuous plate. Alternatively, the web 214 may have thickened border beams (or channels) and/or ribs and thinner web portions or openings between the beams and/or ribs. Further details are provided below.

The vertical side 210 of the load transfer member 200 may extend, by one form, at most from the top 132 of the longitudinal rail 118 up to the shock tower cap 126 and can depend on the height of the shock tower 124. By one form, the load transfer member 200 may be about six to twelve inches tall at the vertical side 210. The bottom side 202 of the load transfer member 200 can extend from the vertical brace (here at vertical brace coupling area or portion 131) to be near interior corner 206 of the load transfer member 200, and to a distal end of the longitudinal rail 118, which may depend on the distance on the top surface 132 of the rail 118 that has clearance for the load transfer member and a forward extension or overhang length of the rail 118. The angle and shape of the ramp surface 212 also can vary depending on the target load transfer and absorption desired also as explained in greater detail below.

Figure 3:
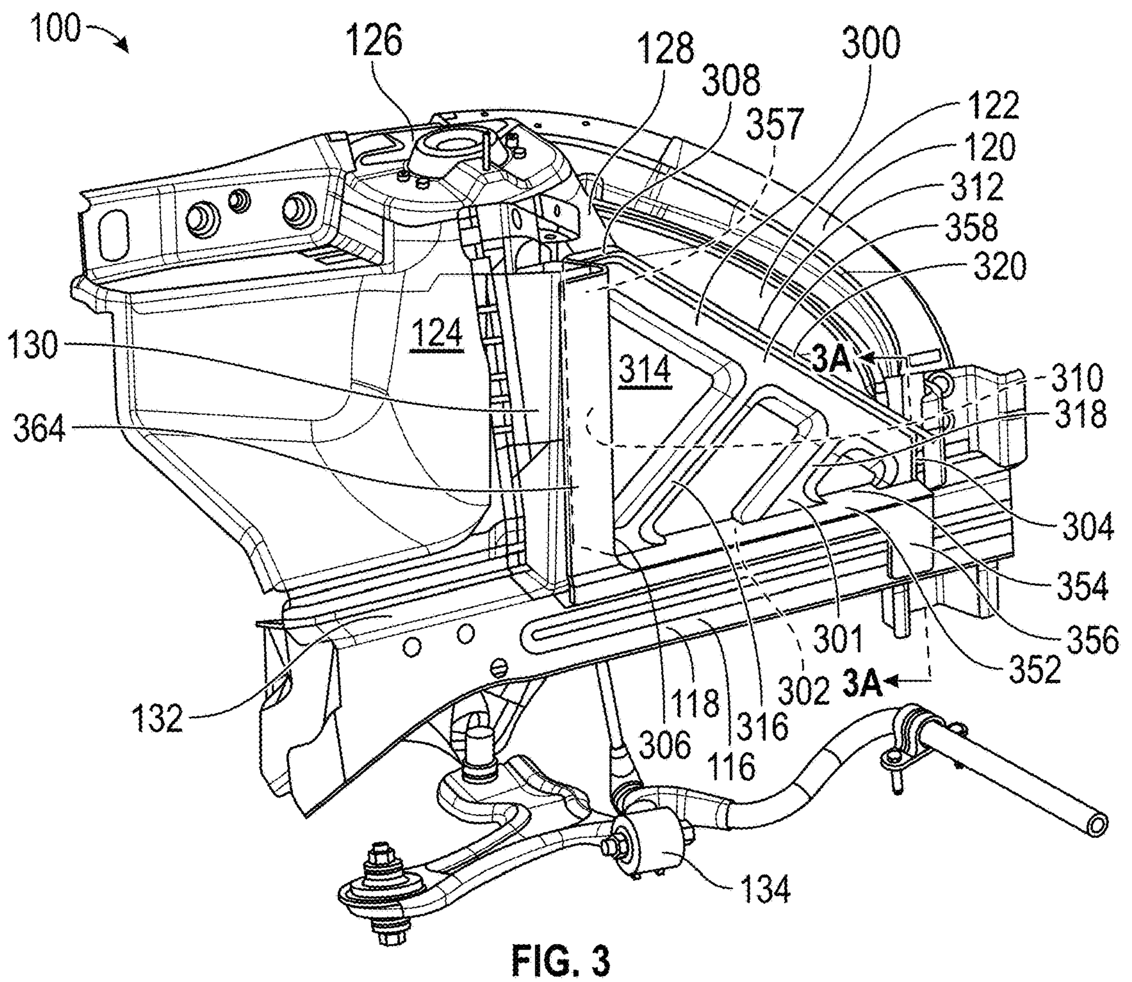
FIG. 3 is a schematic diagram of a cross-sectional perspective, exterior-facing side and upper view of a front left side of the vehicle of FIGS. 1-2 with an example load transfer member according to at least one of the implementations herein.

Referring to FIG. 3, an example load transfer member 300 has the same or similar components as load transfer member 200 so that the same parts numbered similarly need not be described again. Here, however, a web 314 has a thickened ramp beam (or channel) 358 and thickened ribs 316 and 318 extending downward and rearward from the ramp beam 358. Thinner web portions extend between the ribs 316, 318, and the beam 358 so that horizontal impact loads are directed by the ramp beam 358 and ribs 316, 318 to create vertical load components as described below.

By one form, the load transfer member 300 may sit with a tight fit for example on the rail 118 and against vertical brace 130 without a permanent connector. In other alternatives, however, the load transfer member 200 is coupled by more than contact or tight fit to better ensure that the member 200 stays in position despite any motion of the vehicle 100. In this case, the load transfer member 300 has a lower plate (or other shaped member) 352 coupled to the top 132 of the rail 118 and a vertical plate (or other shaped member) 357 coupled to the vertical brace 130. By one example, the lower plate 352 has a downwardly extending flange 356, here shown with a short portion and a tall portion, and that engages an interior side of the rail 118, while the vertical plate 357 has a longitudinally extending flange 364 that engages an interior side of the vertical brace 130 to add lateral stability.

Figure 3A:
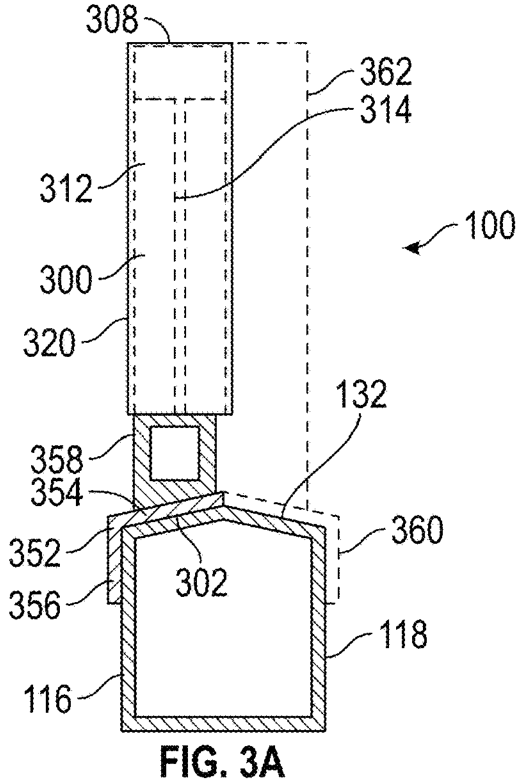
FIG. 3A is a schematic diagram of a front cross-sectional view of the load transfer member of FIG. 3 according to at least one of the implementations herein.

Referring to FIG. 3A, the lower plate 352 also supports an end of the ramp beam 358 while a ramp flange 320 may extend over, and wider than, the ramp beam 358. The load transfer member 300 is constructed on a single half of the rail 118, but it will be understood that alternatively, a second, mirrored half 362 of the member 300 may be used and have the same construction as the half shown, including another downwardly extending flange 360 on an exterior side of the rail 118 to add even more lateral stability and to absorb and/or transfer more loads. Thus, the load transfer member 300 may be narrower (in the lateral direction), the same width, or even wider than the rail 118 as desired. When wider than the rail 118, the area of load impact on the load transfer member 300 becomes greater.

To couple the load transfer member 300 to the rail 118 and vertical brace 130, the member 300 may be spot welded when the member is made of steel, glued or otherwise adhered, riveted, such as self-piecing rivets for aluminum and mixed metal systems, bolted, and so forth.

Figure 4:
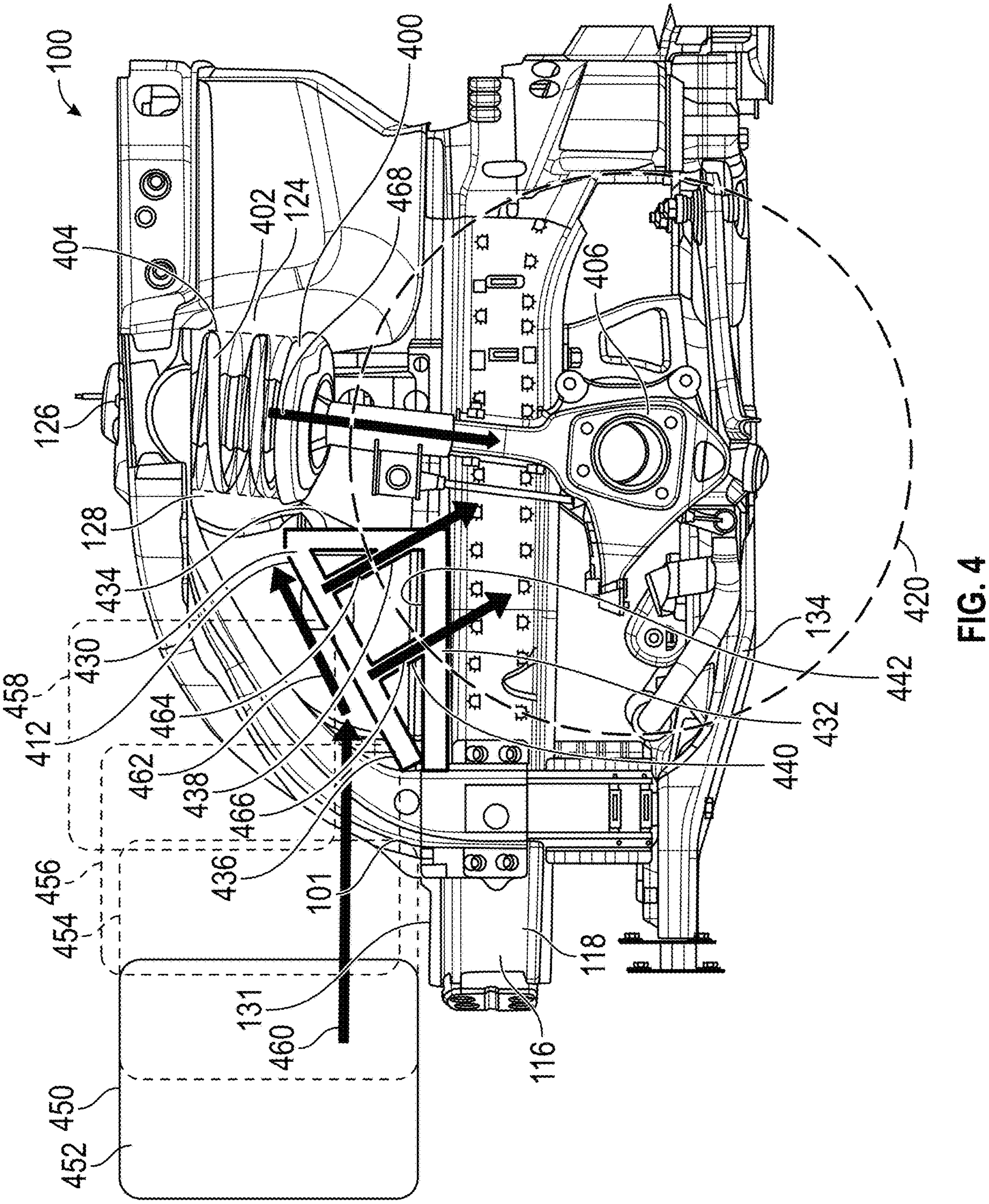
FIG. 4 is a schematic diagram of a cross-sectional, interior-facing side view of a front left side of a vehicle with an example load transfer member and example vertical suspension assembly according to at least one of the implementations herein.

Referring to FIG. 4, vehicle 100 has a vertical suspension assembly 400 within the shock tower 124 and that compressively couples to suspension system 134 and a wheel 420. Specifically in this example, vertical suspension assembly 400 may have any shock or strut component or components that compress vertically (or substantially or generally vertically) between the shock tower 124 and a hub or axle (not shown) of a wheel 420 or suspension system 134. In this example, a single shock spring 402 is shown in a cylinder or piston 404, and may be, or may be part of, a mono or twin-tube shock absorber. The assembly 400 may have a lower mount portion that provides a lower part of the piston 404 and couples to the suspension system 134, and in turn the wheel 420. Many other types of shock or strut components may be used as part of the vertical suspension assembly 400.

The vehicle 100 in this example has a load transfer member 430 that is similar to the load transfer member 300 (FIG. 3) and with a lower beam 432, coupled to a vertical beam 434, and a slanted ramp beam 436 with a flat, straight outer ramp surface 412 extending upward from the lower beam 432 and to the vertical beam 434 completing a triangle with the three beams. Two rib beams or channels (or just ribs) 438 and 440 extend downward and rearward from the ramp beam 436. Instead of a solid web as on load transfer member 300, here load transfer member 430 has openings 442.

To explain the reaction of the load transfer member and components of vehicle 100 upon experiencing a horizontal impact load 460 upon contact with a barrier 450 shown here at an initial position 452 in front of the vehicle 100. Such a barrier 450 is as described above. Whether the barrier is moving to the right toward the vehicle 100, or the vehicle 100 is moving toward the barrier 450 to the left, a first impact may occur at a position 454 of the barrier 450 where the barrier 450 first impacts the body 101 of the vehicle 100 and begins to press parts of the body 101 inward (to the right).

Next at position 456, the barrier 450 first impacts the ramp beam 436 of the load transfer member 430 and begins to slide upward on the ramp surface 412 and relative to the cap 126 of the shock tower 124. Note that this is a simple way of showing the motion. However, it will be understood that in reality, the barrier may not change its vertical height, and the load transfer member 430, and in turn vehicle components near load transfer member 430, is actually being pressed to move downward as the barrier 450 moves inward and to the right on the load transfer member 430, thereby initiating the underride.

This also starts an initial load bleed-off where the load transfer member 430 begins to absorb some of the horizontal load 460 from the barrier 450.

Thereafter, the barrier 450 rides the slanted or diagonal ramp beam 436 and ramp surface 412 (similar to riding the ramp surface 312 or 212) as shown by load arrow 462. The exertion of force against the ramp beam 436 also converts the horizontal load into both horizontal and vertical load components. The ribs 438 and 440 direct some part of both the vertical and horizontal loads downward and rearward as shown by rib load arrows 464 and 466. This transfers vertical component loads onto the rail 118 and downward, which in turn pulls the vertical brace 130 (FIG. 3) downward. The downward pulling of the vertical brace 130 results in the vertical brace pulling the sidewall 128 and in turn the cap 126 of the shock tower 124 downward, which applies a downward load on the vertical suspension assembly 400. Thus, this pushes the front of the vehicle 100 down while using the compression of the suspension assembly 400 to vertically absorb at least some of the load, but can be a significant amount of the load. Through the assembly 400 and suspension system 134, the wheel 420 also receives and absorbs some of the vertical load.

Simultaneously and/or subsequently to the barrier 450 impact on the ramp beam 436, the angle of the ramp beam 436 causes the barrier 450 to "rise" relative to the shock tower 124 and subsequently impact the sidewall 128. This may cause the barrier 450 to push the sidewall 128 into the vertical suspension assembly 400. Otherwise, the barrier 450 may cut through the sidewall 128 and other components around the assembly 400 and impact the assembly 400 itself. Either way, this impact will be relatively high on the assembly 400, at or near the shock spring 402 in this example due to the ramp surface 412, which can impart additional significant vertical and downward load onto the assembly 400 due to the higher impact point.

Adding, or better ensuring, impact on the vertical suspension assembly 400, if the barrier itself, or by moving the load transfer member 430 horizontally and (here) to the right against the vertical brace 130 (shown in FIG. 3), this action can either pull the vertical brace 130 downward or into the sidewall 128 and in turn into the assembly 400, or both, such that this can apply even more vertical downward force onto the assembly 400.

In addition, the rise of the barrier 450 on the load transfer member 430 also can cause the barrier 450, and components of the vehicle in front of the barrier 450, to impact the wheel 420 at a higher location (closer to a top of the wheel) rather than only on a side of the wheel, which again, can create a larger vertical load component to press downward against the top of the wheel 420.

As a result, the generation of these vertical loads alone or combined redirects a significant part of the initial horizontal or longitudinal load 460, so that the remaining longitudinal load causes a reduced longitudinal compression at the engine compartment. This can be significantly longitudinally shorter than without the load transfer member 430.

The parameters of the load transfer member can be controlled to preset an impact load path that creates vertical loads (or vertical load components) and a balance between absorbing (or "bleeding off") loads (or energy) and quickly transferring loads to vertical loads as desired to achieve target performance requirements (this also may factor load requirements from industry standards such as new car assessment program (NCAP) that provides target limits of the amount of force to be experienced by a passenger or driver). The performance requirements can be accomplished by using a topology strategy to set the geometry of the load transfer member to obtain certain stiffness, strength, and resilience desired to establish a load path. Such a technique involves setting parameters of the load transfer member such as the dimensions of the load transfer member, angle and shape of the ramp surface, as well as border structure, web structure, materials, and mounting mechanism in the vehicle. The resulting load transfer member is then tested.

As to the outer dimensions of the load transfer member (as described above with FIGS. 2-3), the longer the longitudinal length and vertical height, the more load can be absorbed and transferred to vertical loads with less parts and structure. A longitudinal attachment plane (and length) on a bottom surface of the load transfer member to engage the longitudinal rail can vary extending from the vertical shock tower brace at an interior end to the distal end depending on clearance to a front extension or overhang length of the longitudinal rail. The height of the load transfer member can extend from the top of the rail to the top of the shock tower (or bottom of a shock tower tie bar if present). Once tuning of the other parameters and balancing of industry load limitations mentioned herein occurs, a resulting length and height of the load transfer member may be 50-75% of the maximum clearance length and height available. By one form, the height of the load transfer member is about 6-12 inches.

Much of the same development applies to the lateral cross-section of the load transfer member. Thus, as shown in FIG. 3A described above and by one example form, the lateral width of the load transfer member may be tuned to be set smaller than a width of the rail or may have the same width of the rail. Otherwise, however, the load transfer member can be wider than the rail to whatever clearance is provided within the vehicle for such width.

As to the general or exact angle of the ramp surface of the load transfer member, the slope can be set to manage how quickly the load transfer member will dissipate (or absorb) loads versus convert initial loads into vertical loads (or load components) and transfer the vertical loads (and other) loads. Thus, the angle may be set to decelerate the impact loads.

The border structure may include border beams or channels described above, and may have cross-section shapes, material, and dimensions (length and thicknesses) to meet performance and manufacturing requirements. This may include using box or rectangular channels in one example, where the channels may be integrally formed, or formed of separate plates coupled together, such as by welding and so forth. Examples of such structures are provided below in FIGS. 5-11.

Likewise, the web structure of the load transfer member can have many different configurations, some of which are shown below in FIGS. 5-11. This can include providing support ribs or other thickened structure across the web of the load transfer member that can be used to set the load path and be aligned and set for load absorption and/or load transfer for loads received from the ramp surface of the load transfer member. The number of ribs as well as the shape, material, position, and size of the ribs can be set for these purposes (for efficient load absorption and/or transfer). The ribs may extend laterally on one or both sides of a thin web between the ribs. The ribs can also be used to control intentional deformation and/or fracture of the load transfer member. The ribs can be horizontal, vertical, diagonal, straight, curved, parallel or non-parallel to each other. The cross-sectional shape of the ribs may be a flat plate parallel to the web surface or perpendicular to the web surface, or may have a C, box, I, circular, or any other desired cross-sectional shape. Many variations are contemplated. The ribs may have parameters to control the timing of the load transfer. Thus, as one example, thinner ribs, with less strength than thicker ribs, on the web may be positioned closer to the front distal end of the load transfer member to encourage quick conversion to vertical loads versus thicker ribs towards the back of the load transfer member to emphasize load absorption. More detailed examples are provided below.

The ramp surface of the load transfer member also may have many different arrangements to control the load transfer and absorption. The ramp surface may be flat and planar to permit faster load transfer, or may have curves, steps, or other irregularities to decelerate the load transfer. Examples are provided below. By one form, the ramp surface is set so that the impact loads will not fracture the load transfer member. In this case, the barrier is permitted to slide along the ramp surface without significant structure breakdown or deformation at the load transfer member to slow the barrier.

In other alternatives, the load transfer member is arranged to break (crack) or deform while the barrier is sliding on the load transfer member. In this case, the materials and dimensions of the diagonal or ramp beam and ramp surface are selected to intentionally permit such a breakdown, crack, or deformation. This can be controlled to occur at initial contact before transferring loads or to transfer loads more quickly into vertical loads. Ribs on the web of the load transfer member can be positioned to assist with controlling the location of the fracture or deformation. The ramp surface can be shaped with multiple different slopes, shapes, or even steps to vary the different load absorption or load transfer along its length as described below.

Referring again to FIGS. 3-4 for comparison, and as mentioned above, the load transfer members 300 and 430 both have two diagonal, generally parallel ribs (316, 318 or 438, 440 respectively) extending downward and rearward from the ramp beam 358 or 436, respectively. This converts the initial horizontal load impacting the ramp surface 312 or 412 into downward vertical load components on the ribs (316, 318 or 438, 440).

Referring now to FIGS. 5-11, more example alternative load transfer members are provided for different load transfer parameter priorities, and in addition to that on the load transfer members 200, 300, and 430 described above.

Figure 5:
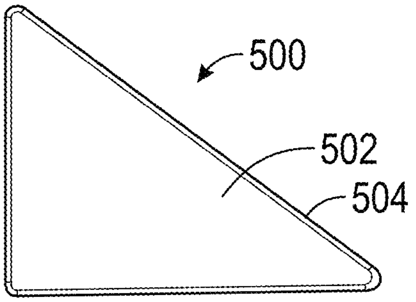
FIG. 5 is a schematic diagram of a side view of an example load transfer member according to at least one of the implementations herein.

Referring to FIG. 5, an example load transfer member 500 has a triangular, planar web 502 with a straight, flat, ramp surface 504, thereby forming a wedge shape. Such a shape provides fast load conversion from horizontal loads impacted at the ramp surface 504 into vertical downward loads.

Figure 6:
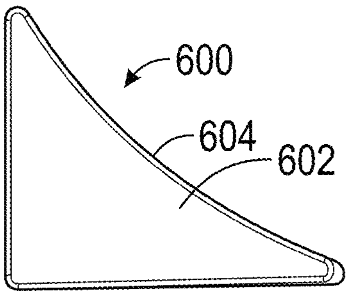
FIG. 6 is a schematic diagram of a side view of another example load transfer member according to at least one of the implementations herein.

Referring to FIG. 6, an example load transfer member 600 has a generally triangular web 602 and a curved concave ramp surface 604. This may slow the load transfer as the slope becomes steeper as a barrier slides along the ramp surface 604. Instead, the ramp surface may be convex for the opposite effect.

Figure 7:
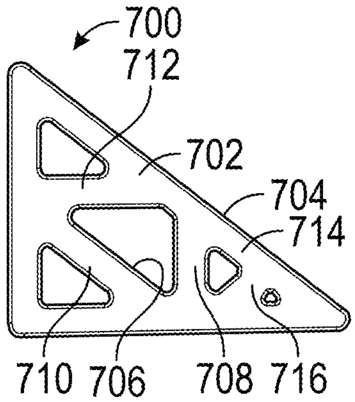
FIG. 7 is a schematic diagram of a side view of yet another example load transfer member according to at least one of the implementations herein.

Referring to FIG. 7, an example load transfer member 700 has a web 702 with ribs 708, 710, and 712 between holes 706. The ribs 708 and 712 extend from a ramp beam 714, while rib 710 extends diagonally and parallel to the ramp beam 714. A small rib 716 also is provided. This creates a truss type of structure to control the flow of the loads through the web 702, while the holes may save material costs. A ramp surface 704 in this example is planar or flat.

Figure 8:
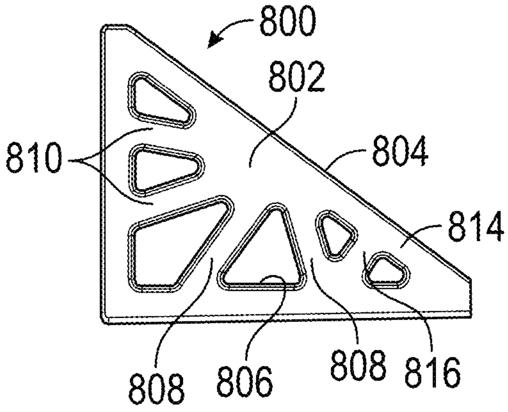
FIG. 8 is a schematic diagram of a side view of an alternative example load transfer member according to at least one of the implementations herein.

Referring to FIG. 8, similar to member 700, here too an example load transfer member 800 has multiple ribs 808 and 810 between openings 806 except here in a generally radial arrangement from a center of a ramp beam 814. A small rib 816 is provided here too.

Figure 9:
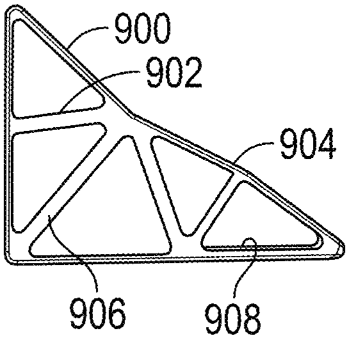
FIG. 9 is a schematic diagram of a side view of another alternative example load transfer member according to at least one of the implementations herein.

Referring to FIG. 9, an example load transfer member 900 has significantly narrower ribs 906 between large openings 908, where the ribs 906 form a triangular truss structure. A ramp surface 902 may be both convex and concave to form a general or exact waveform or sinusoidal surface. This creates a variation in load transfer speed as a barrier slides along the ramp surface 904.

Figure 10:
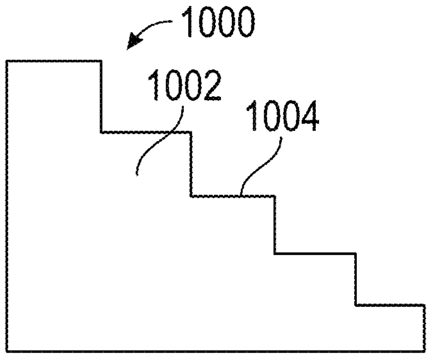
FIG. 10 is a schematic diagram of a side view of yet another alternative example load transfer member according to at least one of the implementations herein.

Referring to FIG. 10, an example load transfer member 1000 has a solid web 1002 and an irregular ramp surface 1004, such as stepped here. This can cause a progressive deceleration of load transfer with alternating slow and fast transfers as the barrier slowly rises up risers and then moves quickly (relative to the rise) horizontally over runs of the steps. The steps can be used to limit fracture of the load transfer member by reducing the transfer speed in intervals due to the steps.

Figure 11:
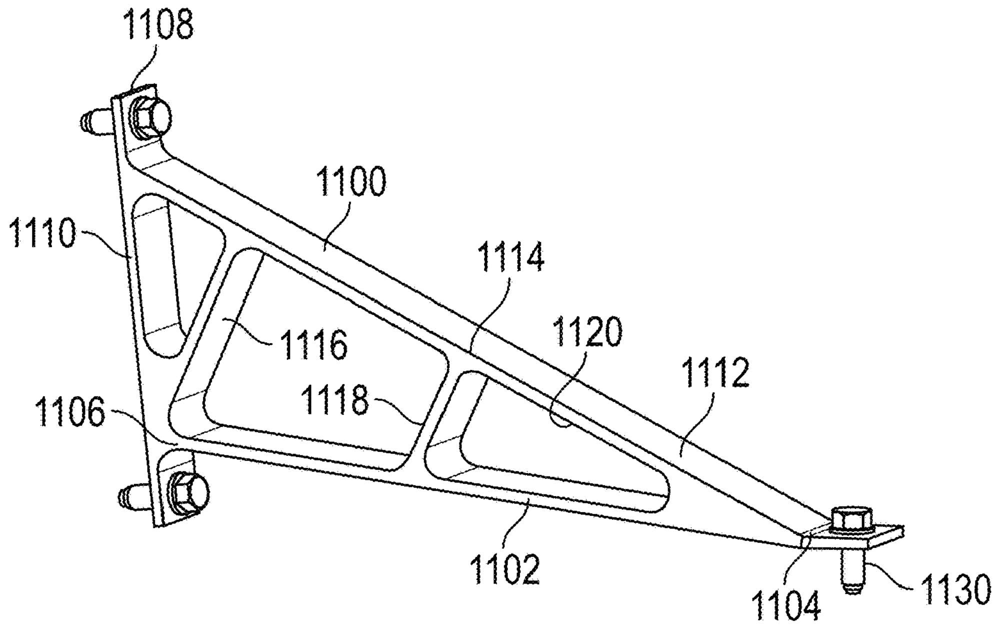
FIG. 11 is a schematic diagram of a side view of an optional example load transfer member according to at least one of the implementations herein.

Referring to FIG. 11, an example load transfer member 1100 has a lower beam 1102 that is also slanted from a distal end 1104 to an interior end 1106. A raised end 1108 is on top of a vertical beam 1110 coupled to the lower beam 1102 at the interior end 1106. A ramp beam 1112 completes the triangle between the vertical and lower beams 1102 and 1110, and has a planar flat ramp surface. In this case, two narrow ribs 1116 and 1118 extend downward from the ramp beam 1112 and terminate at the vertical beam 1110 and lower beam 1102, respectively. Relatively large openings 1120 are formed between the beams 1102, 1110, 1112 and ribs 1116, 1118.

Figure 12:
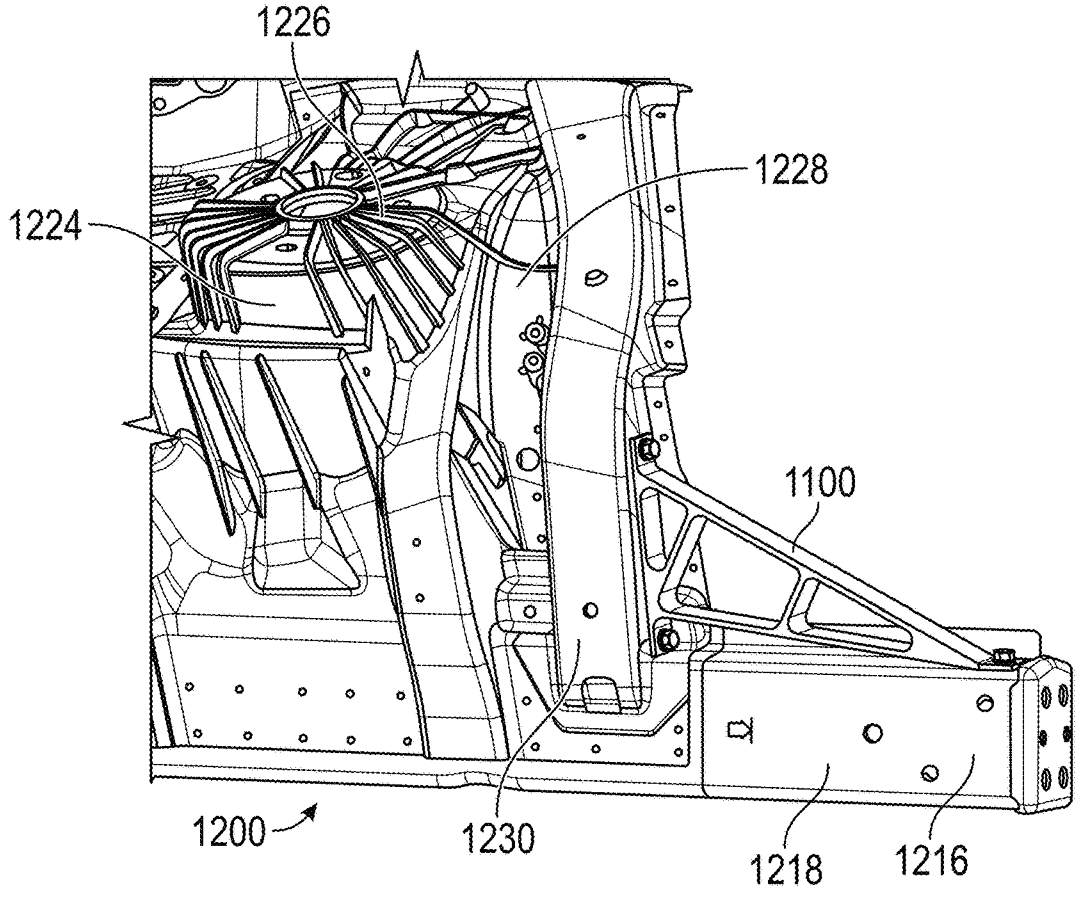
FIG. 12 is a schematic diagram of a cross-sectional perspective, exterior-facing side and upper view of a front left side of an alternative vehicle with the example load transfer member of FIG. 11 according to at least one of the implementations herein.

Referring to FIG. 12, an example vehicle 1200 shows the load transfer member 1100 mounted on a rail 1218 of a chassis 1216. The distal end 1104 of the load transfer member 1100 is fastened to the rail 1218 by fastener (e.g., bolt or rivet) 1130 while two ends of the vertical beam 1110 are fastened in the same manner to a vertical shock tower brace 1230 of a shock tower 1224. The lower beam 1102 is slanted to rise above the rail 1218 as it extends to the vertical beam 1110. This load transfer member 1100 can be arranged to stay in position and transfer load to the rail 1218 and brace only through the fasteners, or may be arranged to collapse onto the rail with sufficient impact load from a barrier sliding on the ramp beam 1112. Also as mentioned above, a number of different ways to couple the load transfer member to the rail and vertical brace exist instead of, or in addition to, the fasteners 1130.

Any single feature or any combination of the features described on FIGS. 5-12 may be used on a load transfer member as desired.

With regard to the materials of the load transfer members, the greater the density of the material, the greater the load absorption at the load transfer member, and less load transfer from the load transfer member. Thus, the materials can be modified to efficiently absorb and/or transfer loads. For example, a laser welded blank may be used where the front of the load transfer member (or ribs at the front) may be a softer material to absorb loads while the rear of the load transfer member or ribs may be a stronger steel to transfer loads. Many variations are contemplated.

Non-metallic materials such as carbon fiber may be used to allow the load transfer member to intentionally break in the stepped arrangement (FIG. 10) or plastically deform the load transfer member, and may be formed by molding. Energy absorption, on the other hand, through deformation, may be used with metallic options to attempt to maintain clastic deformation within the metal's elastic limit rather than plastic deformation. Which material to use also may depend on other manufacturing processes available as follows.

The load transfer member can be manufactured in several different ways. For cold stamped steel for example, the load transfer member may be made of steel or aluminum, where any gauge or grade may be used when available and desired. For extrusion, an aluminum load transfer member may be used, and variable wall thicknesses from wall to wall or on the same wall, and to form the ribs described above, can be used to vary performance and function (whether to absorb or transfer the loads). Here too, grades can be selected as desired.

For casting, the load transfer member may be made of steel, magnesium, aluminum, or some combination for example. Here too, variable wall thickness from wall to wall or on the same wall can be used to vary performance and function. As to molding, the load transfer member may be made of sheet molding compound (SMC), carbon fiber, glass filled composite, plastic, and so forth. The walls of the load transfer member may be varied as mentioned for the other manufacturing techniques. The casting may include the use of Multi-metal tooling (MMT).

One example development process may include the following operations. First, identify the barrier height to set the same initial height of the load transfer member (here referred to as a wedge) so the barrier will contact wedge upon an impact. Next, determine the packaging space so the dimensions of the wedge can be set as mentioned above. Thereafter, the load path angle up the ramp of the wedge can be identified.

In a further operation, the balance of absorption and transfer is determined to set how quickly initial impact loads are to be directed downward into vertical loads. To accomplish this, materials are selected and the parameters of these (dimensions, material, ramp angle) is adjusted to obtain better performance. Tuning of the load path angle then may be performed as well as setting the shape of a ramp configuration (straight, curved, multiple transitions, etc. as described above). The web structure is then set, with ribs, solid web or openings, and so forth to absorb energy and/or transfer energy along the desired load path.

By one alternative structure, the load transfer member may be placed in the back of the vehicle instead of, or in addition to, the front of the vehicle. In this case, the load transfer member may extend laterally off of the longitudinal rails and may even be in the trunk or other structure of the body of the vehicle, such as wings or fins. By one form, the load transfer member may have a different orientation so that the vertical side or member is in the back while the ramp faces downward as it rises to a distal end pointing towards the front of the vehicle. In this case, the load transfer member attempts to assist in directing another vehicle or barrier to move under a back of the current vehicle.

It will be appreciated that the systems, vehicles, devices, apparatuses, and methods may vary from those depicted in the Figures and described herein. For example, the vehicle 100 of FIGS. 1-4, and any of the components of FIGS. 1-4, may differ from that depicted in FIGS. 5-12.

While at least one example implementation has been presented in the foregoing detailed description, it should be appreciated that a vast number of variations exist. It should also be appreciated that the example implementation or example implementations are only examples, and are not intended to limit the scope, applicability, or configuration of the disclosure in any way. Rather, the foregoing detailed description will provide those skilled in the art with a convenient road map for implementing the example implementations. It should be understood that various changes can be made in the function and arrangement of elements without departing from the scope of the disclosure as set forth in the appended claims and the legal equivalents thereof.

What is claimed is:

1. A vehicle, comprising:

a front, a back, and a chassis extending longitudinally between the front and the back;

at least one vertical suspension assembly having an upper end coupled to the chassis, a lower end coupled to a wheel, and a sidewall extending downwardly from the upper end;

a load transfer member disposed between the at least one vertical suspension assembly and the front or back, wherein the load transfer member comprises a distal end, a raised end higher than the distal end, and a ramp portion with an outer ramp surface extending between the distal end and the raised end, wherein the distal end is closer to the front or back than the raised end so that the ramp surface faces outward on the vehicle, and wherein the raised end extends upward toward the upper end of the vertical suspension assembly;

a longitudinal rail forming part of the chassis;

a vertical brace extending upward from the longitudinal rail and being proximal to the sidewall, and wherein the raised end faces the vertical brace, wherein the raised end is coupled to the vertical brace.

2. The vehicle of claim 1, wherein at least a part of the load transfer member is disposed directly over the longitudinal rail and coupled to the longitudinal rail to transfer loads from the load transfer member to the longitudinal rail.

3. The vehicle of claim 1, wherein the the sidewall extends at least partly around the vertical suspension assembly.

4. The vehicle of claim 1, wherein the load transfer member is arranged so that a horizontal force impacted at the ramped portion causes the raised end to move downward against the vertical brace or sidewall to cause a downwardly directed load on the vertical suspension assembly.

5. The vehicle of claim 1, wherein the load transfer member is wedge-shaped, wherein the raised end forms a top of the wedge shape, and wherein a vertical side of the load transfer member faces or is coupled to the vertical brace or sidewall.

6. The vehicle of claim 1, wherein the load transfer member is triangular and has a solid web.

7. The vehicle of claim 1, wherein the load transfer member is triangular and has a bottom side, a vertical side extending between the bottom side and the raised end, and at least one rib extending from the diagonal portion to either the bottom side or the vertical side.

8. The vehicle of claim 1, wherein the ramp surface is at least one of:

planar, curved, concave, convex, waveform, sinusoidal, uniformly stepped, and non-uniformly stepped.

9. The system of claim 1, wherein the load transfer member has a flange to engage an interior side of the vertical brace, wherein interior is relative to the vehicle.

10. A load transfer member on a vehicle, comprising:

a web having a triangular shape with an outer bottom surface with a distal end, an outer vertical surface with a raised upper end, and a ramp surface between the raised upper end and the distal end, the web comprising:

a bottom beam having the bottom surface and being coupled to a longitudinal rail of a chassis of the vehicle, and a vertical beam having the vertical surface and being coupled to a vertical shock tower brace extending upward from the longitudinal rail, wherein the vertical shock tower brace is coupled to a sidewall covering a vertical suspension assembly, wherein the web is disposed between the vertical suspension assembly and a front of the vehicle, wherein the distal end is more exterior on the vehicle than the raised end so that the ramp surface faces outward on the vehicle, and wherein the raised end extends upward toward an upper end of the vertical suspension assembly.

11. The member of claim 10, wherein the web comprises at least one rib positioned to direct external load impacted at the ramp surface at least partially vertically downward through the web.

12. The member of claim 11, comprising a ramp beam having the ramp surface, and wherein the at least one rib extends from the ramp beam and toward the vertical surface, the bottom surface, or both.

13. The member of claim 10, wherein the web comprises a thin plate portion between multiple ribs or an opening between multiple ribs or both.

14. The member of claim 10, wherein the web is formed of multiple diagonal parallel ribs extending downward and rearward from the ramp beam.

15. The member of claim 10, wherein the web is formed of multiple ribs forming a triangular truss pattern or a non-parallel rib pattern.

16. An impact load transfer system, comprising:

a vehicle comprising:

a front, a back, and a chassis extending longitudinally between the front and the back, and at least one vertical suspension assembly having an upper end coupled to the chassis and a lower end coupled to a wheel; and a load transfer member disposed between the at least one vertical suspension assembly and the front or back, wherein the load transfer member comprises a distal end, a raised end higher than the distal end, and a ramp portion with an outer ramp surface extending between the distal end and the raised end, wherein the distal end is closer to the front or back than the raised end so that the ramp surface faces outward on the vehicle, wherein the raised end is proximal to the vertical suspension assembly, and wherein the load transfer member is triangular and has a bottom side, a vertical side extending between the bottom side and the raised end, a ram portion that is a diagonal portion, and at least one rib extending from the diagonal portion to either the bottom side or the vertical side.

17. The system of claim 16, wherein the load transfer member is formed of a crackable material and structure while impacting expected load amounts.

18. The system of claim 16, wherein the load transfer member is arranged on the vehicle so that the ramp surface causes an external barrier to cause an impact to the vertical suspension assembly closer to a top of the vertical suspension assembly than would occur without the load transfer member.

19. The system of claim 16, wherein the load transfer member comprises two portions each with a different material than the other portion to provide different load absorption and load transfer properties at the two portions.

20. The system of claim 16, wherein two of the at least one ribs extend from the ramp beam and one rib toward the vertical surface and one rib toward the bottom surface.

* * * * *